(12) United States Patent
Luttrell et al.

(10) Patent No.: US 10,296,279 B2
(45) Date of Patent: May 21, 2019

(54) DISPLAYING IMAGES ACROSS MULTIPLE DISPLAYS

(71) Applicant: Lenovo (Singapore) Pte. Ltd., Singapore (SG)

(72) Inventors: Wesley Abram Luttrell, Raleigh, NC (US); Daniel Jordan Schantz, Raleigh, NC (US); Christopher Miles Osborne, Cary, NC (US); Vincent Charles Conzola, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 327 days.

(21) Appl. No.: 14/276,576

(22) Filed: May 13, 2014

(65) Prior Publication Data
US 2015/0331654 A1    Nov. 19, 2015

(51) Int. Cl.
*G09G 5/00*  (2006.01)
*G06F 3/14*  (2006.01)

(52) U.S. Cl.
CPC .......... *G06F 3/1446* (2013.01); *G06F 3/1423* (2013.01); *G09G 2300/026* (2013.01); *G09G 2300/04* (2013.01); *G09G 2354/00* (2013.01)

(58) Field of Classification Search
CPC .. G06F 3/0482; G06F 3/04845; G06F 3/0481; G06F 3/04817; G06F 3/0486; G06F 3/1454; G06F 3/1446; G06F 17/2235; G06F 17/30905; G06F 17/212; G06F 17/30058; G06F 17/30994; G06F 1/1615; G06F 1/163; G06F 3/1423; G06F 1/1647; G06F 1/1616; G06F 1/1641; G06F 1/1649; G06F 2203/04803; G06F 1/1618; G09G 2370/04; G09G 3/002; G09G 2330/021; G09G 2340/0464; G09G 2310/0237; G09G 2320/041; G09G 2320/064; G09G 2320/0646; G09G 2320/0653;

(Continued)

(56) References Cited

U.S. PATENT DOCUMENTS

| 8,836,611 B2 * | 9/2014 | Kilpatrick, II | G06F 1/1616 345/1.3 |
| 8,988,313 B2 * | 3/2015 | Takishita | G06F 3/1446 345/1.3 |

(Continued)

OTHER PUBLICATIONS

Applicant's Admitted Prior Art (Specifcation paragraph [0034]) Figures 4.*

*Primary Examiner* — Duc Q Dinh
(74) *Attorney, Agent, or Firm* — Ference & Associates LLC (57) ABSTRACT

An aspect provides a method, including: receiving, using a processor, data to be displayed across at least two hingedly coupled display devices; determining, using a processor, the display mode of the data, the display mode being selected from the group consisting of an occluded mode and a non-occluded mode; in the occluded mode, processing, using a processor, the data to occlude pixels of the data based upon the determined display mode, the pixels being occluded at a location where a physical separation exists between the at least two hingedly coupled display devices; and displaying, using the at least two hingedly coupled display devices, the data according to the display mode determined. Other aspects are described and claimed.

20 Claims, 5 Drawing Sheets

(58) Field of Classification Search
CPC ..... G09G 2320/066; G09G 2320/0666; G09G 2340/045; G09G 2356/00; G09G 5/006; G09G 2300/026; G09G 2340/0407; G09G 2340/12; G09G 2340/14
USPC ......... 345/156, 204.168, 169, 173, 175, 1.1, 345/1.2, 1.3, 2.1, 2.2, 2.3
See application file for complete search history.

(56) References Cited

U.S. PATENT DOCUMENTS

| | | | |
|---|---|---|---|
| 9,298,413 B1* | 3/2016 | Karve | G06F 3/1446 |
| 2009/0015513 A1* | 1/2009 | Kim | G06F 3/1446 |
| | | | 345/1.3 |
| 2010/0039350 A1* | 2/2010 | Wakefield et al. | 345/1.3 |
| 2011/0164065 A1* | 7/2011 | Mate | G06F 3/1446 |
| | | | 345/676 |

* cited by examiner

DISPLAYING IMAGES ACROSS MULTIPLE DISPLAYS

BACKGROUND

It is common for users to employ the use of multiple display devices. For example, an office worker may have two or more computer monitors mounted on their desk. Additionally, many electronic devices contain two displays, which may or may not contain touch capability.

All of these devices provide a way of displaying many different images on the screens. The processing systems of these devices also allow the images to be displayed across both screens. In other words, part of the image is displayed on one screen (i.e., display) and the other part of the image is displayed on the other screen.

BRIEF SUMMARY

In summary, one aspect provides a method, comprising: receiving, using a processor, data to be displayed across at least two hingedly coupled display devices; determining, using a processor, the display mode of the data, the display mode being selected from the group consisting of an occluded mode and a non-occluded mode; in the occluded mode, processing, using a processor, the data to occlude pixels of the data based upon the determined display mode, the pixels being occluded at a location where a physical separation exists between the at least two hingedly coupled display devices; and displaying, using the at least two hingedly coupled display devices, the data according to the display mode determined.

Another aspect provides a system, comprising: at least two hingedly coupled display devices; one or more processors operatively coupled to at least one of the at least two display devices; and a memory storing instructions executable by the one or more processors to: receive data to be displayed across the at least two hingedly coupled display devices; determine the display mode of the data, the display mode being selected from the group consisting of an occluded mode and a non-occluded mode; in the occluded mode, process the data to occlude pixels of the data based upon the determined display mode, the pixels being occluded at a location where a physical separation exists between the at least two hingedly coupled display devices; and display, using the at least two hingedly coupled display devices, the data according to the display mode determined.

A further aspect provides a computer program product, comprising: a storage device having code stored therewith, the code being executable by a processor and comprising: code that receives, using a processor, data to be displayed across at least two hingedly coupled display devices; code that determines, using a processor, the display mode of the data, the display mode being selected from the group consisting of an occluded mode and a non-occluded mode; code that in the occluded mode, processes, using a processor, the data to occlude pixels of the data based upon the determined display mode, the pixels being occluded at a location where a physical separation exists between the at least two hingedly coupled display devices; and code that displays, using the at least two hingedly coupled display devices, the data according to the display mode determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(B-C) illustrates an example of a displayed image across multiple displays.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many times users are using either multiple displays connected to a computing system, or are using an electronic device that has multiple displays built into the device. One problem with a multi-screen device is the separation of the two screens due to physical separation, e.g., the bezel and hinge (or other type of connection), that is present between the individual screens. Not only does physical separation exist between the two parts of the image, but visual separation also exists, e.g., half of the image is displayed on one display, while the other half of the image is displayed on the other display. Devices with multiple displays are common and most have some type of physical separation between the two displays (e.g., a bezel and distance between two monitors sitting on a work surface).

In such situations, the traditional way of displaying an image (e.g., a picture, a text document, a slideshow, a video, a desktop background, etc.) is by splitting the image between the multiple screens with no offset. In other words, when the image is pushed from one screen to another those pixels are immediately presented on the other screen. Generally, the human visual system can adapt to this behavior. In some cases this method is adequate or even preferred by a user. For example, if a user is viewing a text document across multiple screens, the user would likely prefer that all the text is displayed even if it is broken across the physical separation between the two screens.

However, in some cases, this screen behavior is undesirable. For example, if a user is viewing a desktop background that spans across multiple screens, the user may rather have the background appear to be obstructed by the physical separation, e.g., giving the appearance of looking at the background through a windowpane. However, not only does this option does not currently exist, but the option to choose how an image is displayed also does not exist.

Accordingly, an example embodiment provides a method that allows the system to determine the display mode, i.e., determine how an image should be displayed across multiple monitors. The system may determine the display mode by analyzing the image content. For example, the system may determine that the content of the image is mostly text and may thereby determine that the image should be displayed broken (without pixel occlusion) across the multiple monitors. Additionally, an embodiment provides a method for displaying an image as if it is being viewed through a windowpane, i.e., with pixel occlusion.

While the system may have preset content preferences (e.g., a mostly text image would be displayed broken while a picture would be displayed with a hidden area), an embodiment also may provide a user with a choice of how to display such images. In either case, both the system and/or user may choose the view of the image using, i.e., using a conventional method wherein there is no pixel occlusion and the image is broken between the multiple screens or using the windowpane method wherein pixels are occluded and the image appears partially hidden by the physical separation between screens.

The illustrated example embodiments will be best understood by reference to the figures. The following description is intended only by way of example, and simply illustrates certain example embodiments.

Figure 1:
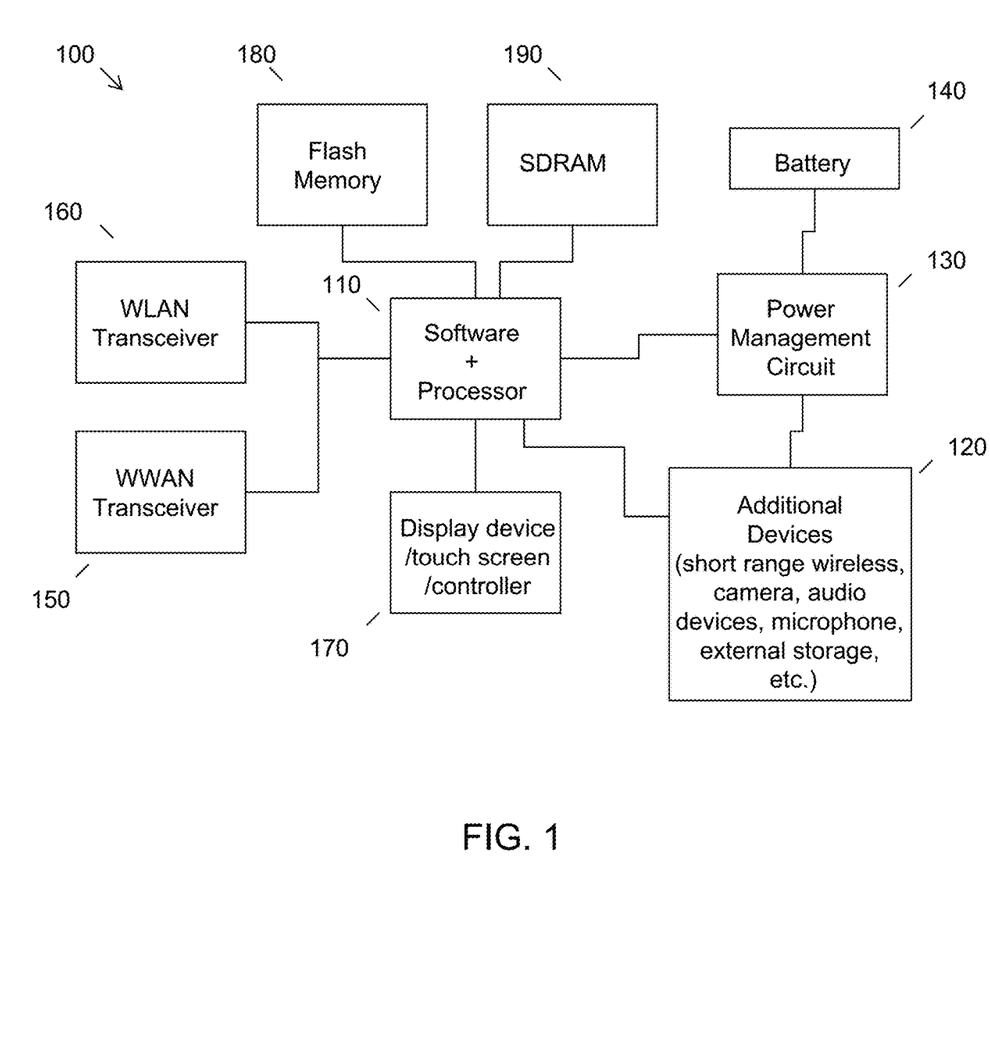
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a display device 170 for display/rendering. This may include more than one display device, as for example illustrated in FIGS. 4A and 4B. Often the display device 170 is a touch screen for data input and display/rendering. If a touch screen is not included, the system may include different peripherals (e.g., a keyboard and/or mouse) for data input. System 100 also typically includes various memory devices, for example flash memory 180 and SDRAM 190.

Figure 2:
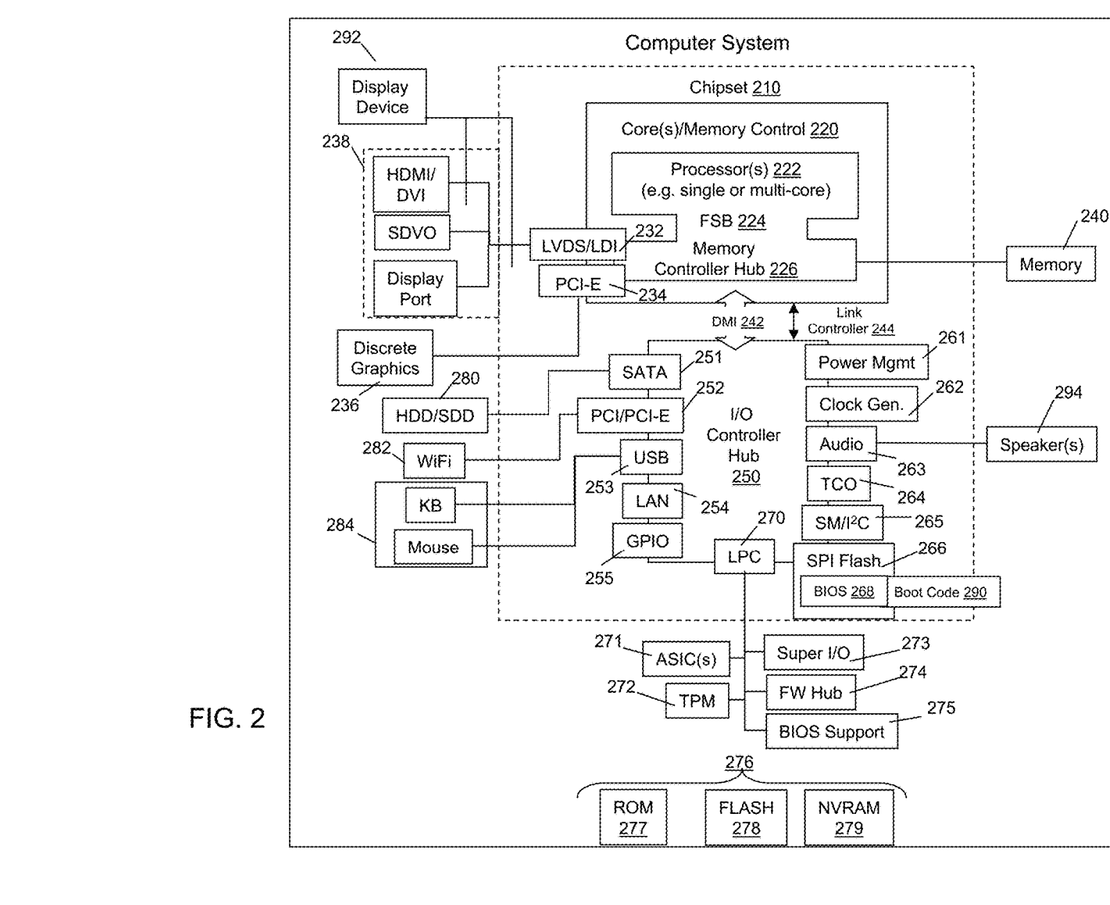
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). The system may include more than one display device 292. A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in computing devices that provide video input to the multiple displays, whether the displays are integrated into the device or are operatively connected thereto. Alternatively or additionally, circuitry such as outlined in FIG. 1 and/or FIG. 2 may be included in a display unit itself.

Figure 3:
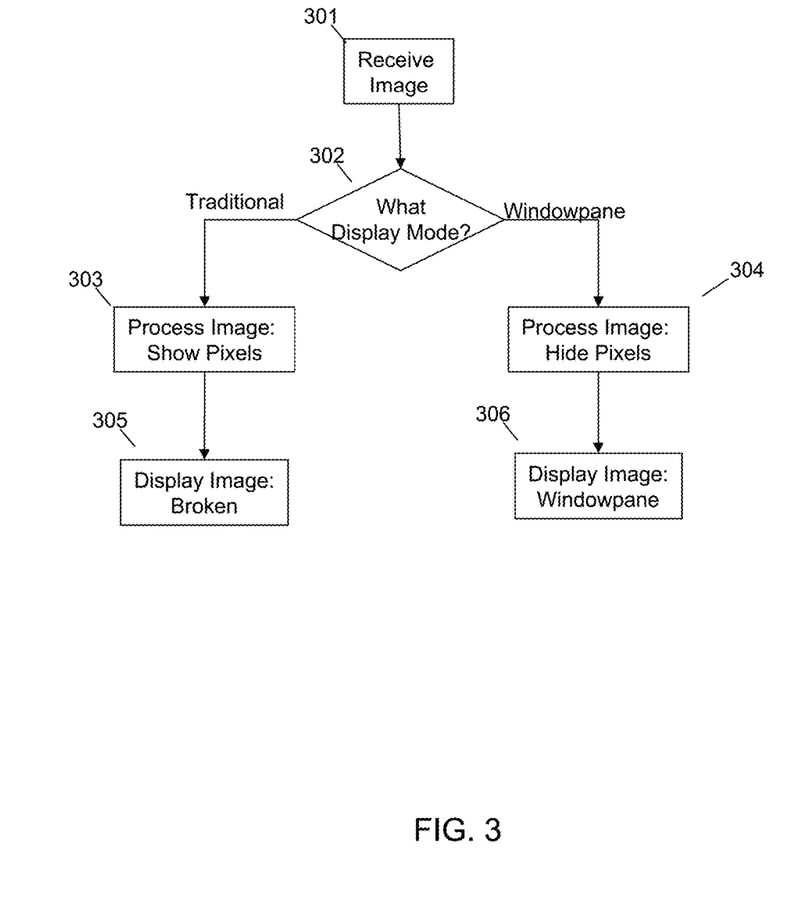
FIG. 3 illustrates an example method of displaying images across multiple displays.

Referring to FIG. 3, in an embodiment the image processing unit may receive image data at 301, e.g., access of an image file stored locally. The image (e.g., anything to be displayed on the display units such as text, an application, a picture, a video, a map, etc.) may be intended to be displayed across at least two display devices (e.g., monitors, touch screen and auxiliary display, projector displays, etc.). In one embodiment, at 302, the processor may determine what display mode to use to display the image across the at least two display devices. Alternatively, in an embodiment, the user may, at 302, determine what display mode to use to display the image across the multiple display devices.

The processor may determine what display mode to use to display the image by identifying the content type of the image to be displayed. For example, the processor may determine that the image to be displayed is an image that contains mostly picture or graphics data and not text. The image may be identified or typed using a variety of techniques, e.g., by determining a file type of the data, a formatting or compression technique used for the data, a location or source of the data, etc.

The processor may display different types of images in certain ways or modes, as described herein. For example, an image that lacks text (e.g., a photograph) may be displayed in an occluded mode where pixels are purposefully not displayed, i.e., in the bezel or separation area between the display devices, as further illustrated in FIG. 4C.

Figure 4A:
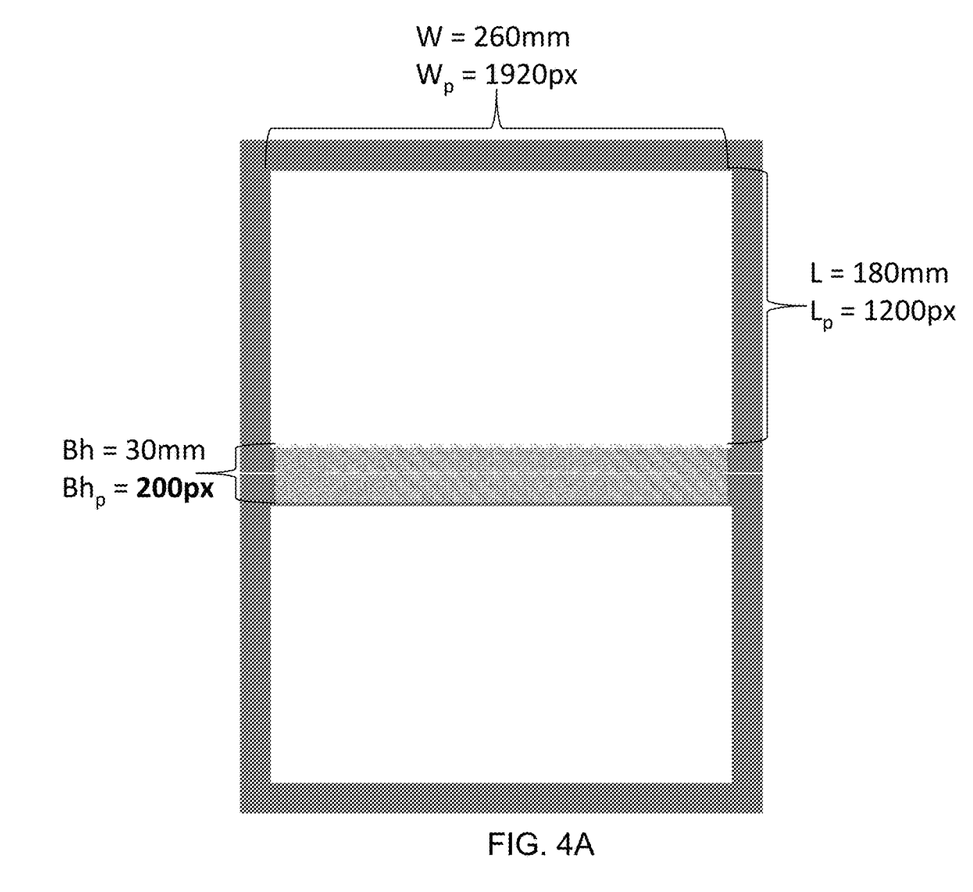
FIG. 4A illustrates an example dual display device with example dimensions.
Figure 4B:
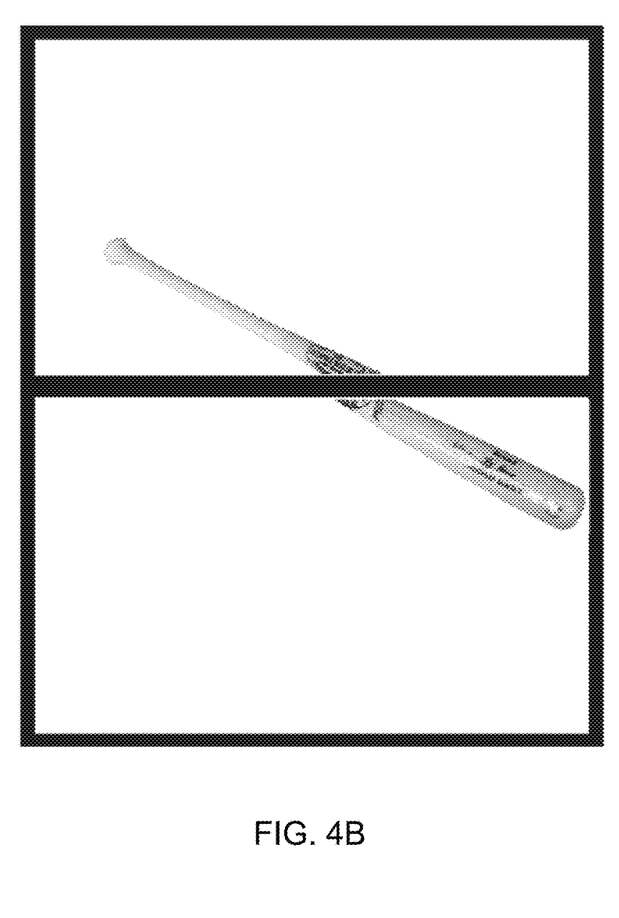

Alternatively, the processor may determine the image to be displayed is mostly text and may display this type of image in an alternative way, e.g., a conventional mode where no pixels are occluded, e.g., as illustrated in FIG. 4B. The processor may have preset conditions for specific content. For example, the processor may be preset to display mostly picture images using the windowpane mode (explained in further detail below). Alternatively, the processor may be preset to display mostly text images using the traditional mode (also explained in further detail below).

Alternatively or additionally, in one embodiment, a user interface may be presented. This interface may allow the user to choose how to display an image. The system may then accept the user selection and display the image using the chosen method. The system may also track these user selections and may learn how the user prefers to display certain images with specific content. For example, if a user generally chooses to display a video using a particular method (e.g., traditional mode), the system may learn the user preference. The system may then automatically display images with this content (e.g., video) using the user preferred method (e.g., traditional mode).

At 303 or 304, the system may process the image so that it can be displayed across the multiple display devices. This processing may include adjusting the pixel behavior at the location in the image where the physical separation of the display devices (e.g., the bezel and hinge) occurs. In other words, the system may adjust the image so that part of the image is occluded at 304 and displayed in a windowpane mode, e.g., as indicated at 306, or the system may adjust the image so that it is split without occlusion at 303 and displayed in a traditional or broken mode, as illustrated in 305.

Based upon the determination of the display mode, by the processor or the user, the system may determine the appropriate display mode for the image such as a traditional display mode (e.g., the system determines that a text image should be displayed in traditional mode). FIG. 4B illustrates an example of traditional mode where pixel occlusion is not implemented.

In FIG. 3, at 303, the system may process the image based upon this display mode selection (i.e., traditional mode). This processing may comprise showing all pixels of the original image. At 305, the image may then be displayed broken across the physical separation. In other words, for example, part of the image would be displayed on one display unit and the other part of the image would be displayed on the other display unit. In this type of image processing, the entire image will be displayed across both screens with no missing pixels. In other words, for example, when the image is pushed from one screen to the other, the next line of pixels is presented on the second screen.

Figure 4C:
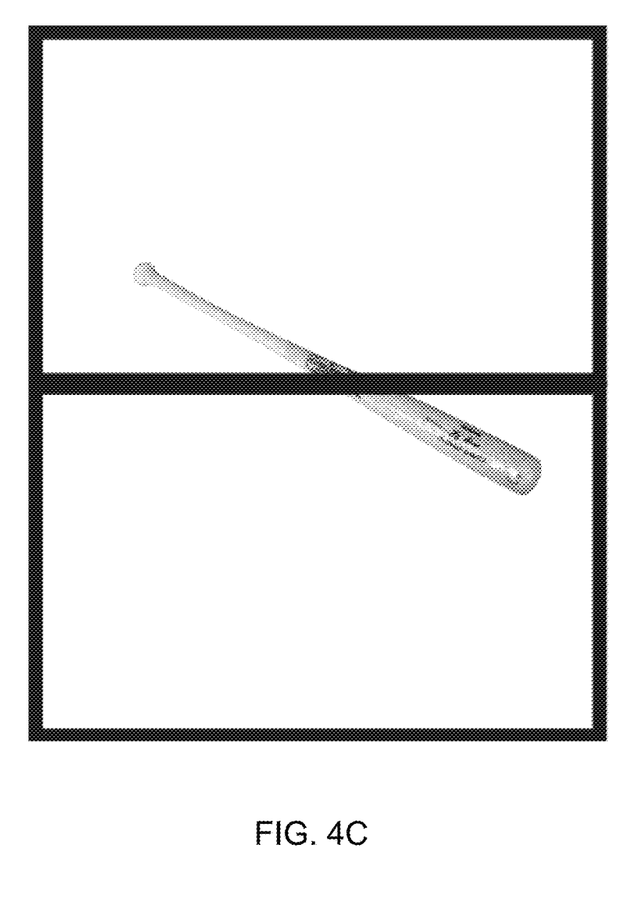

Alternatively, in an embodiment, the system, based upon input by either the processor or the user, may determine the image should be displayed in a windowpane display mode (e.g., the system determines the picture image should be displayed in windowpane mode). FIG. 4C illustrates an example of windowpane mode. In FIG. 3, the system may process the image, at 304, based upon this mode selection (i.e., windowpane mode). This processing may include hiding the pixels represented by the physical separation (e.g., the bezel and physical distance between two monitors). At 306, the image may then be displayed across the physical separation of the multiple display units as if the part of the image at the barrier is hidden from view. In other words, for example, the pixels (e.g., part of the image) that span the physical separation may be hidden from the user creating an image that gives the effect of looking through a windowpane. When the image is pushed from one screen to the other, the pixels representing the distance of the physical separation are hidden. Additionally, in an embodiment, the processing at 304 may include adjusting the image to ensure alignment across the physical separation.

In one embodiment, the system may detect the type of display device. For example, as illustrated in FIG. 4A, the system may determine that a certain brand and model of monitor or display unit is connected to or used by the system. The system may then determine characteristics associated with that display (e.g., the size of the display area, the size of the bezel, etc.). Based upon these characteristics, the system may determine the approximate size of the physical separation of the display devices, e.g., in terms of the pixel size of the image to be occluded. This may allow the system to better represent the distance of the physical separation when determining an amount of pixels to hide or occlude in the image to be displayed in the windowpane mode across the multiple display devices.

As illustrated in FIG. 4A, the physical screen width, W, and the physical screen length, L, may be associated with or mapped to a pixel value, e.g., Wp and Lp, respectively, for a given resolution of the screen. If the bezel height, Bh, or like metric separating the usable screen areas, is known, a bezel height (or like value) may also be represented by or mapped to a pixel value, Bhp. Thus, as illustrated, an embodiment may determine the number and location of pixels in the image or other data to be displayed that should be occluded in an occluded mode. For example, an embodiment may calculate the Bhp value according to:

$$L/Lp=Bh/Bhp.$$

This permits an embodiment to automatically determine an amount and location of pixels to occlude.

Alternatively, in one embodiment, the system may display a user interface to allow the user to adjust the size of physical separation. For example, the user may tell the system using the user interface such as a slider that the physical separation between the two display units is a particular distance, for example 3 inches. In one embodiment, the user interface may allow the user to align the image and realign the image in a preview mode such that the system may be calibrated for image occlusion. The system may then use this input to adjust the amount of pixels that are hidden from the user to better mimic a windowpane. Because the user interface may include an input element, e.g., a box or slider, where the user may enter an offset value, the user interface may also allow the user to see an immediate change in the image (e.g., by way of an example image preview).

Accordingly, as illustrated by the example embodiments and the figures, an embodiment allows an image (e.g., text, application, picture, video, etc.) to be displayed across multiple monitors in different display modes. In one display mode, which may be chosen by either the processor based on image content or by the user, the image may be displayed in traditional mode. This mode may display the image broken across the multiple display devices with all pixels displayed. Alternatively, in another display mode the image may be displayed in windowpane mode. This mode may display the image as if the user is viewing the image through a windowpane (i.e., the pixels representing the physical separation are hidden from the user). Therefore, a user is able to view an image in a visually appealing form.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, using a processor, data to be displayed across at least two display devices;
   determining, using a processor and without user input, the display mode of the data based upon a type of content of the data, the display mode being selected from the group consisting of an occluded mode and a non-occluded mode, wherein a type of content comprising more text than graphics maps to a non-occluded mode and wherein a type of content of the comprising more graphics than text maps to an occluded mode;

in the occluded mode, processing, using a processor, the data to occlude pixels of the data based upon the determined display mode, the pixels being occluded at a location where a physical separation exists between the at least two display devices; and displaying, using the at least two display devices, the data according to the display mode determined.

2. The method of claim 1, further comprising displaying a user interface allowing the user to adjust the determined display mode, wherein the determining the display mode comprises accepting the user input into the user interface.

3. The method of claim 1, wherein the determining the display mode comprises identifying a type of the data to be displayed across the at least two display devices.

4. The method of claim 3, wherein the type of the data is selected from the group consisting of: text, video, map, picture, and application.

5. The method of claim 1, wherein the determining the display mode comprises determining the preferred display mode of data with a specific type based on previous user selections of the display mode of data.

6. The method of claim 1, wherein the processing comprises forming an adjusted image.

7. The method of claim 6, wherein the processing further comprises adjusting alignment of the image across the physical separation.

8. The method of claim 1, further comprising:
detecting a display device type; and
determining the size of the physical separation using predetermined characteristics of the detected display device type.

9. The method of claim 1, further comprising displaying a user interface allowing the user to provide input adjusting the size of the physical separation.

10. The method of claim 1, wherein the displaying comprises displaying, in the non-occluded mode, all pixels of the data.

11. A system, comprising:
at least two display devices;
one or more processors operatively coupled to at least one of the at least two display devices; and
a memory storing instructions executable by the one or more processors to:
receive data to be displayed across the at least two display devices;
determine, without user input, the display mode of the data based upon a type of content of the data, the display mode being selected from the group consisting of an occluded mode and a non-occluded mode, wherein a type of content comprising more text than graphics maps to a non-occluded mode and wherein a type of content of the comprising more graphics than text maps to an occluded mode;
in the occluded mode, process the data to occlude pixels of the data based upon the determined display mode, the pixels being occluded at a location where a physical separation exists between the at least two display devices; and
display, using the at least two display devices, the data according to the display mode determined.

12. The system of claim 11, wherein the instructions are further executable by the processor to display a user interface allowing the user to adjust the determined display mode, wherein the determining the display mode comprises accepting the user input into the user interface.

13. The system of claim 11, wherein to determine the display mode comprises identifying a type of the data to be displayed across the at least two display devices.

14. The system of claim 13, wherein the type of the data is selected from the group consisting of: text, video, map, picture, and application.

15. The system of claim 11, wherein to determine the display mode comprises determining the preferred display mode of data with a specific type based on previous user selections of the display mode of data.

16. The system of claim 11, wherein to process comprises forming an adjusted image.

17. The system of claim 16, wherein to process further comprises adjusting alignment of the image across the physical separation.

18. The system of claim 11, wherein the instructions are further executable by the processor to:
detect a display device type; and
determine the size of the physical separation using predetermined characteristics of the detected display device type.

19. The system of claim 11, wherein the instructions are further executable by the processor to display a user interface allowing the user to provide input adjusting the size of the physical separation.

20. A computer program product, comprising:
a storage device having code stored therewith, the code being executable by a processor and comprising:
code that receives, using a processor, data to be displayed across at least two display devices;
code that determines, using a processor and without user input, the display mode of the data based upon a type of content of the data, the display mode being selected from the group consisting of an occluded mode and a non-occluded mode, wherein a type of content comprising more text than graphics maps to a non-occluded mode and wherein a type of content of the comprising more graphics than text maps to an occluded mode;
code that in the occluded mode, processes, using a processor, the data to occlude pixels of the data based upon the determined display mode, the pixels being occluded at a location where a physical separation exists between the at least two display devices; and
code that displays, using the at least two display devices, the data according to the display mode determined.

* * * * *